(12) United States Patent
Lang et al.

(10) Patent No.: US 10,470,614 B2
(45) Date of Patent: Nov. 12, 2019

(54) ELECTRICAL KITCHEN APPLIANCE

(71) Applicant: Vorwerk & Co. Interholding GmbH, Wuppertal (DE)

(72) Inventors: Torsten Lang, Solingen (DE); Georg Hackert, Bochum (DE); Jutta Schomacher, Wuelfrath (DE); Stefan Kraut-Reinkober, Leverkusen (DE); Andres Sauerwald, Bottrop (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 347 days.

(21) Appl. No.: 15/502,610

(22) PCT Filed: Aug. 11, 2015

(86) PCT No.: PCT/EP2015/068455
§ 371 (c)(1),
(2) Date: Feb. 8, 2017

(87) PCT Pub. No.: WO2016/023900
PCT Pub. Date: Feb. 18, 2016

(65) Prior Publication Data
US 2017/0224174 A1    Aug. 10, 2017

(30) Foreign Application Priority Data

Aug. 12, 2014  (DE) .................. 10 2014 111 508

(51) Int. Cl.
*A47J 27/00* (2006.01)
*A47J 44/00* (2006.01)
(Continued)

(52) U.S. Cl.
CPC .............. *A47J 44/00* (2013.01); *A47J 27/62* (2013.01); *G05B 11/00* (2013.01); *G05B 15/02* (2013.01)

(58) Field of Classification Search
CPC .......... A47J 27/62; G05B 11/00; G05B 15/02
(Continued)

(56) References Cited

U.S. PATENT DOCUMENTS 4,780,588 A * 10/1988 Edamura .............. H05B 6/6438
219/492
4,933,527 A *  6/1990 Edamura .............. H05B 6/6411
219/506

(Continued)

FOREIGN PATENT DOCUMENTS

DE        202 00 419 U1     5/2002
DE    10 2009 059 181 A1    7/2010

OTHER PUBLICATIONS

International Search Report of PCT/EP2015/068455, dated Sep. 4, 2015.

Primary Examiner — Reginald Alexander
(74) Attorney, Agent, or Firm — Collard & Roe, P.C.

(57) ABSTRACT

An electrical kitchen appliance for preparing food has an operator control unit for entering control instructions for control of the electrical kitchen appliance by a user. The operator control unit can be removably attached to the electrical kitchen appliance and, in the process, can be operated in a first operating mode and in a second operating mode, wherein the operator control unit for entering control instructions for control of the electrical kitchen appliance by the user is attached to the electrical kitchen appliance in the first operating mode and is removed from the electrical kitchen appliance in the second operating mode. An electrical kitchen appliance of this kind which has an operator control unit which can be individually operated is provided in this way.

8 Claims, 3 Drawing Sheets

Figure 1:
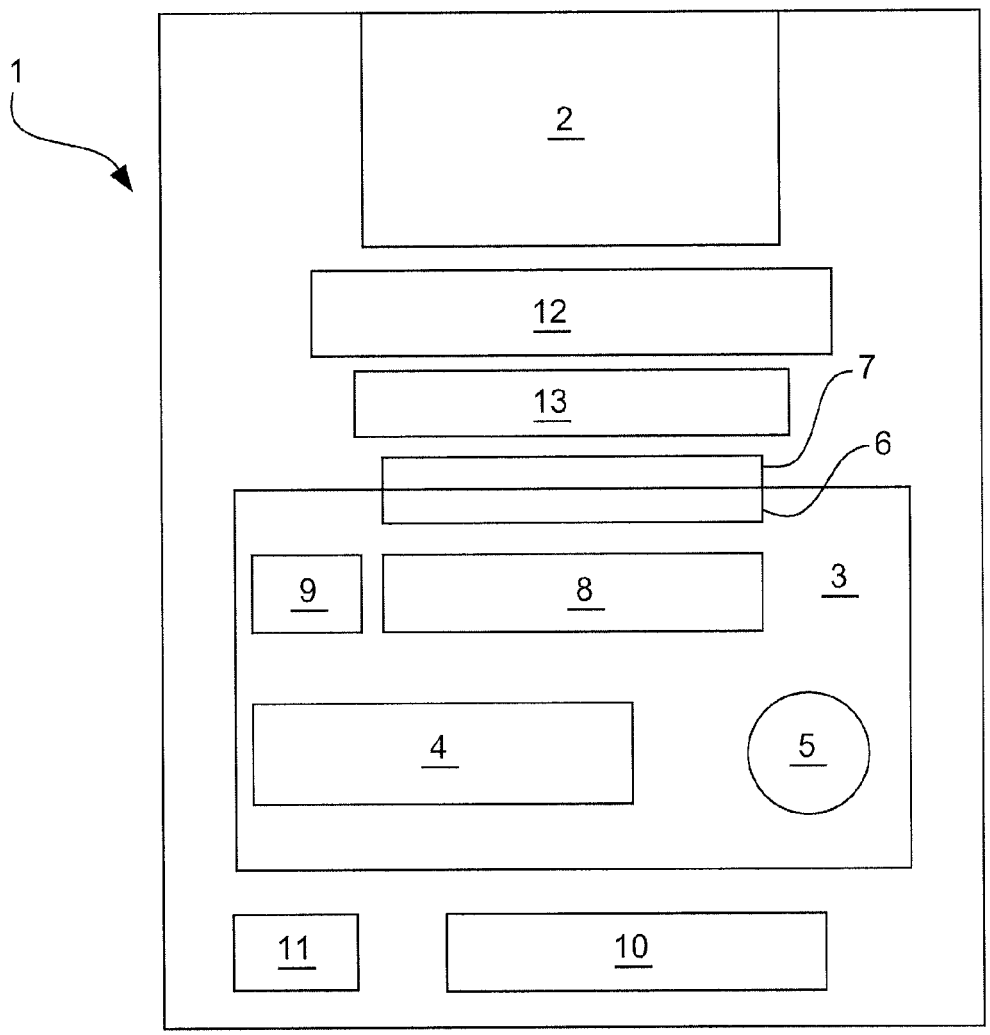

(51) Int. Cl.
*A47J 27/62* (2006.01)
*G05B 11/00* (2006.01)
*G05B 15/02* (2006.01)

(58) Field of Classification Search
USPC .................................. 99/325, 331, 334, 280
See application file for complete search history.

(56) References Cited

U.S. PATENT DOCUMENTS

| | | | |
|---|---|---|---|
| 2006/0254432 A1* | 11/2006 | McLemore | A47J 37/1209 |
| | | | 99/448 |
| 2008/0037232 A1* | 2/2008 | Schroetlin | A47J 31/52 |
| | | | 361/760 |
| 2012/0075065 A1 | 3/2012 | Hilckmann | |
| 2014/0345475 A1* | 11/2014 | Trench Roca | A47J 27/62 |
| | | | 99/325 |
| 2015/0208871 A1* | 7/2015 | Chang | A47J 31/401 |
| | | | 99/325 |

\* cited by examiner

ELECTRICAL KITCHEN APPLIANCE

CROSS REFERENCE TO RELATED APPLICATIONS

This application is the National Stage of PCT/EP2015/068455 filed on Aug. 11, 2015, which claims priority under 35 U.S.C. § 119 of German Application No. 10 2014 111 508.2 filed on Aug. 12, 2014, the disclosures of which are incorporated by reference. The international application under PCT article 21(2) was not published in English.

The invention relates to an electrical kitchen appliance for preparing meals, with an operator control unit for entering control commands for control of the electrical kitchen appliance by the user.

For example, such electrical kitchen appliances are known in the form of universal food processors, which apart from mechanically processing foods, e.g., by means of an agitator or cutting blade, also make it possible to cook the food. In order to prepare a corresponding meal, predetermined recipes are often provided, which exhibit several sequential recipe steps. In order to allow the user of such an electrical kitchen appliance to prepare a meal according to such a predetermined recipe, but also to directly actuate the electrical kitchen appliance with its functions, such devices as a rule exhibit an operator control unit for entering control commands for control of the electrical kitchen appliance by the user. The operator control unit is here configured as an integral part of the electrical kitchen appliance, e.g., in the form of input buttons, knobs or even a touch display on the housing of the appliance.

The object of the invention is to provide the kind of electrical kitchen appliance that exhibits an operator control unit that can be individually operated.

This object is achieved by an electrical kitchen appliance for preparing meals, that has an operator control unit for entering control commands for control of the electrical kitchen appliance by the user, wherein the operator control unit can be removably attached to the electrical kitchen appliance, and in the process can be operated in a first operating mode and in a second operating mode. The operator control unit is attached to the electrical kitchen appliance in the first operating mode and removed from the electrical kitchen appliance in the second operating mode. The operator control unit provides a first range of functions for possible entries of control commands for control of the electrical kitchen appliance in the first operating mode, and a second range of functions for possible entries of control commands for control of the electrical kitchen appliance in the second operating mode, wherein the first range of functions differs from the second range of functions.

As a consequence, the object of the invention is achieved by an electrical kitchen appliance for preparing meals, with an operator control unit for entering control commands for control of the electrical kitchen appliance by the user, wherein the operator control unit can be removably attached to the electrical kitchen appliance, and in the process can be operated in a first operating mode and in a second operating mode, wherein the operator control unit for entering control commands for control of the electrical kitchen appliance by the user is attached to the electrical kitchen appliance in the first operating mode and removed from the electrical kitchen appliance in the second operating mode.

Therefore, one essential point of the invention is to provide the kind of operator control unit for the electrical kitchen appliance that can be operated on the one hand in a state attached to the electrical kitchen appliance, and on the other hand in a state in which it is removed from the electrical kitchen appliance, i.e., in particular not physically in contact with the electrical kitchen appliance. As a result, the user has the option, apart from a conventional operating mode in which the operator control unit is attached to the electrical kitchen appliance and thus basically a part of the electrical kitchen appliance, of also selecting the type of operating mode in which the electrical kitchen appliance on the one hand and operator control unit on the other are separated from each other.

In this way, then, the operator control unit can be spaced a certain distance apart from the electrical kitchen appliance in the second operating mode, so that the electrical kitchen appliance can be operated remotely via the operator control unit. In particular, this enables a use in which the operator control unit is positioned next to a sink, for example, so that the user, who previously had handled the meals to be processed, can wash his or her hands before operating the operator control unit, and then has direct access to the operator control unit. After washing hands, he or she must hence not first return to the electrical kitchen appliance to operate the latter, but can instead actuate the electrical kitchen appliance right away via the operator control unit positioned in proximity to the sink.

In addition, the potential separation of the operator control unit from the electrical kitchen appliance is advantageous in that the operator control unit can also be positioned where a cookbook or recipe is located, for example, which the user draws upon for preparing a specific meal. Therefore, if the user returns to the location of the cookbook, e.g., on the kitchen table, inside of his or her kitchen, he or she can there read the parameters to be set, so as to then enter the latter via the operator control unit provided separately from the electrical kitchen appliance.

However, it is not always only advantageous to separate the operator control unit from the electrical kitchen appliance. Rather, there are also situations in which it is intentionally desired that the operator control unit be provided in proximity to the kitchen appliance, preferably in direct proximity, such as directly at the kitchen appliance. This can be the case in particular when a critical phase in processing has been reached during recipe implementation, and the processing status of the meal must be continuously observed and monitored, for example. To this end, the user must routinely be located in direct proximity to the electrical kitchen appliance, which he or she is forced to do in particular if the operator control unit is attached directly to the electrical kitchen appliance.

As a whole, then, the invention makes available a universal system comprised of an electrical kitchen appliance and an operator control unit provided for the latter, which makes it possible to individually adjust the operation of the operator control unit to varying tasks.

In this conjunction, it is basically possible for the range of functions for possible entries of control commands for control of the electrical kitchen appliance to be the same in the first operating mode as in the second operating mode. What this means, then, is that the operator control unit always provides the user with the same functionality, regardless of whether the operator control unit is attached to the electrical kitchen appliance or removed from the latter. However, a preferred further development of the invention provides that the operator control unit exhibit a first range of functions for possible entries of control commands for control of the electrical kitchen appliance in the first operating mode, and a second range of functions for possible entries of control commands for control of the electrical kitchen appliance in the second operating mode, wherein the first range of functions differs from the second range of functions. This preferred further development of the invention enables a reduction in the range of functions in the second operating mode, i.e., with the operator control unit removed from the electrical kitchen appliance, not least with safety aspects in mind.

In particular, this makes it possible to delete those functions from the range of functions that require or at least suggest the direct presence of the user at the kitchen appliance. These can include functions like actuating a cutting mechanism, which are critical to safety and require that the user ensure that no third party is endangered by the operation of the electrical kitchen appliance. These can further be functions that take place within the framework of this type of implementation of recipe steps, which require that the progress of food processing be observed. In this regard, then, a preferred further development of the invention involves the second range of functions not encompassing at least one possible entry of control commands encompassed by the first range of functions for control of the electrical kitchen appliance.

It is further basically possible that a distinction relative to the respective range of functions only be made in terms of whether the operator control unit is in the first operating mode or second operating mode, i.e., is attached to the electrical kitchen appliance or removed from the latter. However, a preferred further development of the invention provides that the second range of functions depend on the size and/or type of distance between the operator control unit and electrical kitchen appliance. In particular, it can be provided in this conjunction that the range of functions in the second operating mode be reduced even further if the operator control unit is at a predetermined greater distance from the electrical kitchen appliance.

In this conjunction, it is especially preferably provided that the second range of functions be smaller in a case where no visual connection exists between the operator control unit and electrical kitchen appliance than in a case where a visual connection does exist between the operator control unit and electrical kitchen appliance. Specifically, for example, this means that, when the user takes the operator control unit to a different room, i.e., out of the room in which the electrical kitchen appliance is set up, the accessible range of functions that can be actuated by the operator control unit is further reduced. In this way, in particular functions can made completely unactuatable if the latter require the direct presence of the user at the electrical kitchen appliance, or at least in the same room, e.g., for safety related reasons.

In the second operating mode, i.e., with the operator control unit removed from the electrical kitchen appliance, a radio connection is preferably provided for data transfer between the electrical kitchen appliance and operator control unit. This tangibly simplifies handling of the operator control unit by comparison to a wired connection to the electrical kitchen appliance. With this aspect in mind, it can also be provided for the first operating mode, i.e., for when the operator control unit is attached to the electrical kitchen appliance, that data transfer take place by radio. However, a preferred further development of the invention provides that first transmission devices and second transmission devices be furnished for the electrical kitchen appliance and operator control unit, wherein the first transmission devices can be used to transfer the control commands for control of the electrical kitchen appliance via a wired connection between the electrical kitchen appliance and operator control unit in the first operating mode, and the control commands for control of the electrical kitchen appliance can be transferred by radio between the electrical kitchen appliance and operator control unit in the second operating mode.

What this implies, then, is that first transmission devices for the wired transfer of control commands are provided both in the electrical kitchen appliance and in the operator control unit, namely in such a way that they can communicate with each other, while second transmission devices are simultaneously provided between the electrical kitchen appliance and operator control unit for radio transmission. This embodiment of the invention preferably provides for an automatic switching between wired and radio transmission and back if the operator control unit is removed from the electrical kitchen appliance or attached to the latter again.

The electrical kitchen appliance can basically be provided with a plurality of operator control units. Specifically, it is possible in particular for the electrical kitchen appliance, apart from the removably attachable, and thus removable, operator control unit, to exhibit another operator control unit permanently attached to the electrical kitchen appliance. However, a preferred further development of the invention provides that the operator control unit that can be removably attached to the electrical kitchen appliance be the only operator control unit of the electrical kitchen appliance. This makes sense not just from a cost standpoint, but also makes it possible to always offer the user the same input interface without any special outlay, regardless of whether the entry is made directly on the electrical kitchen appliance, or on the operator control unit removed from the electrical kitchen appliance.

It is basically sufficient for the operator control unit that can be removed from the electrical kitchen appliance to be configured for entering control commands for control of the electrical kitchen appliance. In a preferred further development of the invention, however, the operator control unit is additionally provided for outputting information data to the user. The information data are here preferably transmitted in the same way as the control commands for control of the electrical kitchen appliance.

This embodiment is advantageous in particular if the user with the operator control unit is located a distance away from the electrical kitchen appliance that no longer affords him or her with any direct view or access to the electrical kitchen appliance. Regardless of the entry of control data, this can also make sense when the output of information data to the user is intended to inform the latter about the expiration of a predetermined processing time, e.g., that the meal to be prepared is finished, so that it can then be removed from the electrical kitchen appliance in a timely manner.

Finally, a preferred further development of the invention provides that the operator control unit exhibit a pushbutton/rotating button and/or a touch display for entering control commands or outputting information data.

Figure 2:
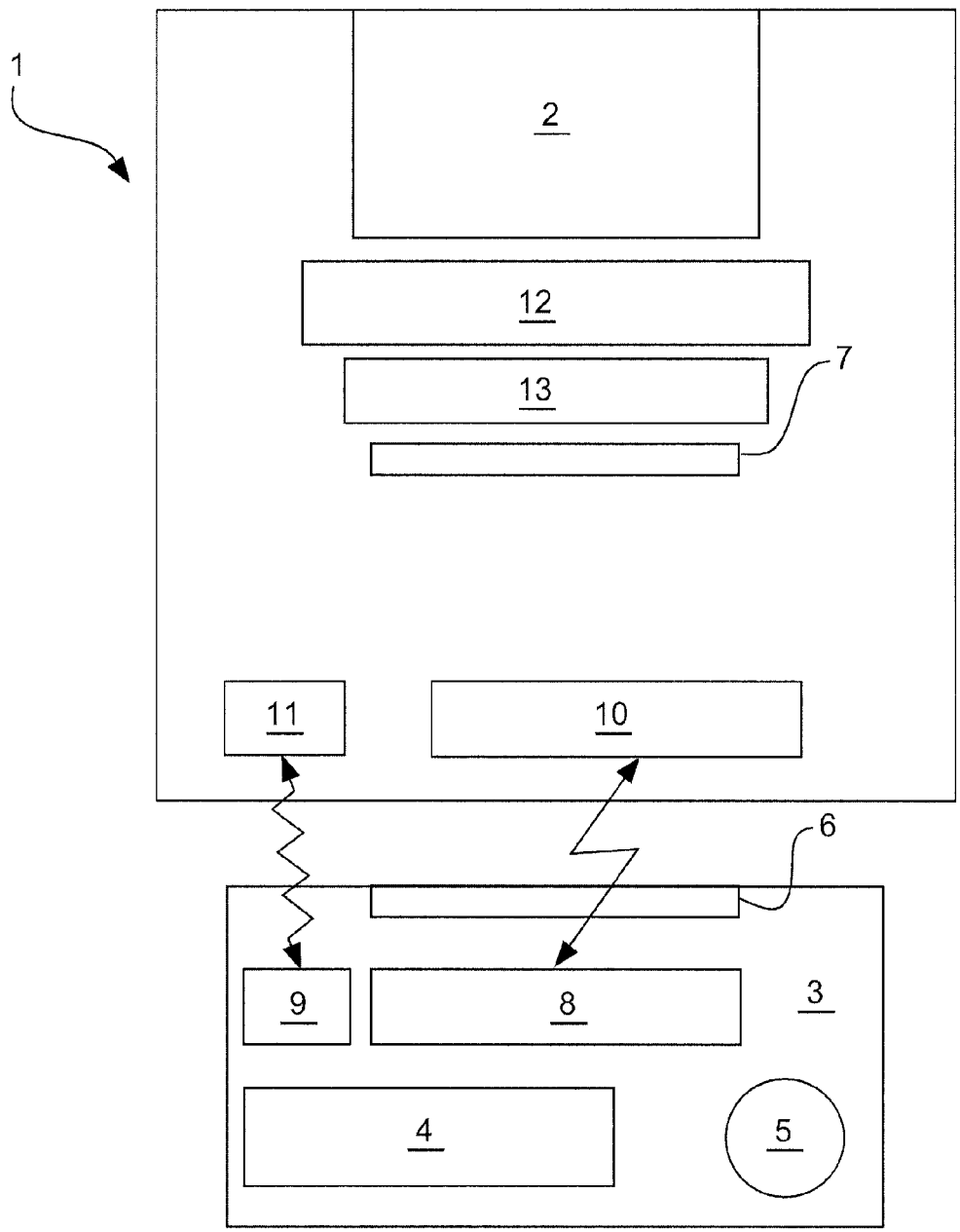
Figure 3:
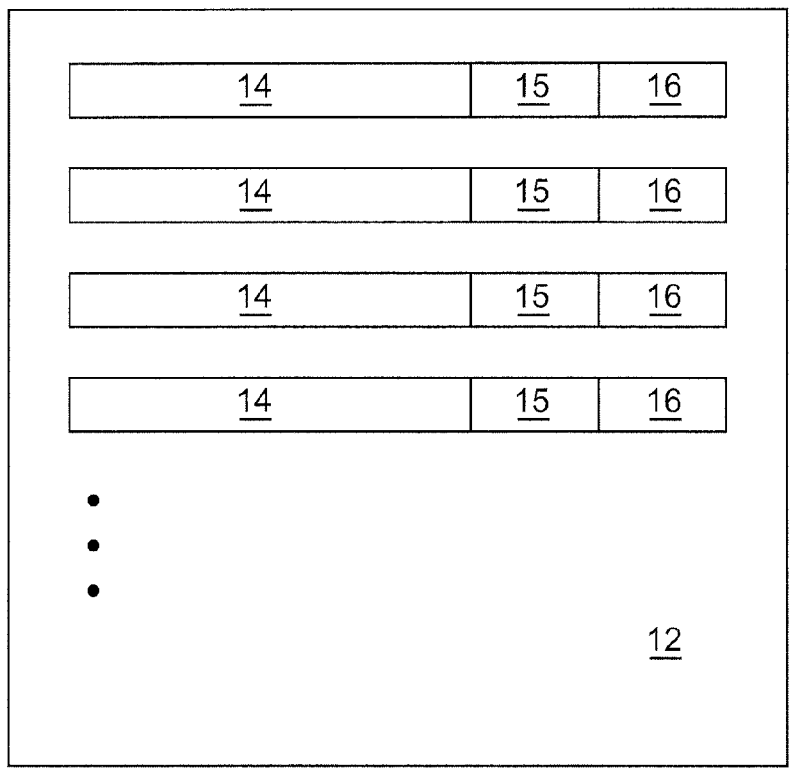

The invention will be explained in greater detail below with reference to the drawing based on a preferred exemplary embodiment of the invention. The drawing shows:

FIG. 1 A schematic view of an electrical kitchen appliance with operator control unit attached thereto for entering control commands for control of the electrical kitchen appliance according to a preferred exemplary embodiment of the invention, FIG. 2 A schematic view of the electrical kitchen appliance according to the presently described preferred exemplary embodiment of the invention with operator control unit removed therefrom, and FIG. 3 A schematic view of a memory of the electrical kitchen appliance according to the preferred exemplary embodiment of the invention with control commands stored therein.

Schematically visible on FIG. 1 is an electrical kitchen appliance 1 for preparing meals according to a preferred exemplary embodiment of the invention. The electrical kitchen appliance 1 exhibits a processing chamber 2 for processing the meals. Since they are not relevant to the invention, processing means inside of the processing chamber 2, such as a heater, an agitator or a cutting blade, are not shown in detail.

The electrical kitchen appliance 1 is further provided with an operator control unit 3, which serves to enter control commands for control of the electrical kitchen appliance 1 by a user. This operator control unit 3 exhibits a touch display 4 along with a push/rotary button 5. The user of the electrical kitchen appliance 1 can enter control commands for control of the electrical kitchen appliance 1 via the touch display 4 and push/rotary button 5. In addition, the touch display 4 serves to output information data to the user.

The operator control unit 3 can now be operated in two different operating modes, specifically in a state attached to the electrical kitchen appliance 1, and in a state removed from the latter. FIG. 1 shows the first operating mode, in which the operator control unit 3 is attached to the electrical kitchen appliance 1. Transmission of the control commands entered via the operator control unit 3 is here wired, specifically via the wired transmission devices 6 on the operator control unit 3 and wired transmission devices 7 on the electrical kitchen appliance. These transmission devices 6, 7 are here configured as a plug/socket combination.

The operator control unit 3 exhibits a radio transmission device 8 along with an infrared interface 9 for the radio transmission of control commands between the electrical kitchen appliance 1 and operator control unit 3, which will be explained in detail below drawing reference to FIG. 2. Correspondingly thereto, a radio transmission device 10 along with an infrared interface 11 are provided in the electrical kitchen appliance 1.

Control commands and functions associated therewith are stored in the memory 12 of the electrical kitchen appliance 1, and a central control unit 13 handles the control of the various devices in the electrical kitchen appliance 1. Not further depicted in any detail is a battery in the operator control unit 3, which is charged via the electrical kitchen appliance 1, specifically via the connection of the wired transmission devices 6, 7 when the operator control unit 3 is arranged on the electrical kitchen appliance 1.

The operating mode of the electrical kitchen appliance 1 with the operator control unit 3 attached thereto is now as follows, as depicted on FIG. 1:

Control commands entered via the touch display 4 or push/rotary button 5 are relayed via the wired transmission devises 6, 7 from the operator control unit 3 to the central control unit 13 of the electrical kitchen appliance 1. To this end, the operator control unit 3 has at its disposal control commands stored in the memory 12 of the electrical kitchen appliance 1. These are relayed to the central control unit 13 and there executed so as to correspondingly actuate the devices of the electrical kitchen appliance. As may be schematically gleaned from FIG. 3, control information 14 is stored in the memory 12 for this purpose, specifically with a first additional information item 15 and a second additional information item 16.

While all control commands given by the control information 14 are available from the memory 2 in the operating mode in which the operator control unit 3 is attached to the electrical kitchen appliance 1, as shown on FIG. 1, this range of functions is reduced in the operating mode depicted on FIG. 2, in which the operator control unit 3 is removed from the electrical kitchen appliance 1. To this end, the respective first additional information item 15 specifies with regard to control information 14 whether the respective control information is also available in the second operating mode, in which the operator control unit 3 is removed from the electrical kitchen appliance 1. This is because specific control functions, in particular those relevant to safety, are not to be offered according to the preferred exemplary embodiment described here with the operator control unit 3 removed, as already explained above.

Beyond that, the second additional information item 16 specifies with regard to the respective control information whether the control command associated therewith is always available with the operator control unit 3 removed, or only when visual contact exists between the operator control unit 3 and electrical kitchen appliance 1. The infrared interfaces 9 and 10 on the operator control unit or on the electrical kitchen appliance 1 are used to check whether visual contact exists between the electrical kitchen appliance 1 and operator control unit 3. The actual transmission of the control commands entered via the operator control unit 3 by the user takes place with the operator control unit 3 removed from the electrical kitchen appliance 1 by way of the radio transmission devices 8, 10 on the operator control unit 3 or on the electrical kitchen appliance 1. Infrared transmission and radio transmission are denoted by corresponding double arrows on FIG. 2.

The exemplary embodiment of the invention described here thus allows the user of the electrical kitchen appliance 1, apart from a conventional operating mode in which the operator control unit is attached to the electrical kitchen appliance 1 and thus part of the electrical kitchen appliance 1, to also select the type of operating mode in which the operator control unit 3 is separated from the electrical kitchen appliance 1. If the operator control unit 3 is positioned a distance away from the electrical kitchen appliance 1 in the second operating mode, the electrical kitchen appliance 1 can be remotely operated by means of the removed operator control unit 3. This can be associated with a plurality of advantages. In particular, the operator control unit 3 can in this way be positioned where the user prefers to enter his or her control commands, e.g., specifically in proximity to a sink or also at the location of a cookbook or recipe, independently of the location of the electrical kitchen appliance 1.

Likewise, however, there are situations in which it is preferred that the operator control unit 3 be directly arranged on the electrical kitchen appliance 1, e.g., namely when a phase during implementation of a recipe has been reached that is especially intensive in terms of monitoring or critical with respect to processing. For example, in order to be able to continuously observe and monitor the processing status of the meal, the user must be in direct proximity to the electrical kitchen appliance 1. Once a corresponding step has been reached in the implementation of a recipe, then, the presently described preferred exemplary embodiment of the invention provides that an actuation via the operator control unit 3 only be possible if the operator control unit 3 is directly attached to the electrical kitchen appliance 1, and connected with the latter via the wired transmission devices 6, 7. In this way, the user is forced to be directly at the electrical kitchen appliance 1.

As a consequence, the presently described preferred exemplary embodiment of the invention as a whole indicates a universal system comprised of an electrical kitchen appliance 1 with a single operator control unit 3, which makes it possible to individually adjust operation by means of this single operator control unit 3 in varying operating modes, specifically on the one hand directly on the electrical kitchen appliance 1 and on the other hand remotely in a state removed therefrom with a respectively differing range of functions.

REFERENCE LIST

1 Electrical kitchen appliance
2 Processing chamber
3 Operator control unit
4 Touch display
5 Press/rotary button
6 Wired transmission devices on the operator control unit
7 Wired transmission devices on the kitchen appliance
8 Radio transmission device on the operator control unit
9 Infrared interface on the operator control unit
10 Radio transmission device on the kitchen appliance
11 Infrared interface on the kitchen appliance
12 Memory
13 Central control unit
14 Control information
15 First additional information
16 Second additional information

The invention claimed is:

1. An electrical kitchen appliance for preparing meals, with an operator control unit (3) configured for operating the electrical kitchen appliance and for entering control commands for control of the electrical kitchen appliance (1) by the user, wherein the electrical kitchen appliance and the operator control unit both provide transmission devices for transfer of control commands, wherein the operator control unit (3) can be removably attached to the electrical kitchen appliance (1), and in the process can be operated in a first operating mode and in a second operating mode, wherein the operator control unit (3) for entering control commands for control of the electrical kitchen appliance (1) by the user is attached to the electrical kitchen appliance (1) in the first operating mode and removed from the electrical kitchen appliance (1) in the second operating mode, wherein the operator control unit (3) provides a first range of functions for possible entries of control commands for control of the electrical kitchen appliance (1) in the first operating mode, and a second range of functions for possible entries of control commands for control of the electrical kitchen appliance (1) in the second operating mode, wherein the first range of functions differs from the second range of functions.

2. The electrical kitchen appliance according to claim 1, wherein the second range of functions does not encompass at least one possible entry of control commands encompassed by the first range of functions for control of the electrical kitchen appliance (1).

3. The electrical kitchen appliance according to claim 1, wherein the second range of functions depends on the size and/or type of distance between the operator control unit (3) and electrical kitchen appliance (1).

4. The electrical kitchen appliance according to claim 3, wherein the second range of functions is smaller in a case where no visual connection exists between the operator control unit (3) and electrical kitchen appliance (1) than in a case where a visual connection does exist between the operator control unit (3) and electrical kitchen appliance (1).

5. The electrical kitchen appliance according to claim 1, wherein first transmission devices (6, 7) and second transmission devices (8, 10) are furnished, wherein the first transmission devices (6, 7) can be used to transfer the control commands for control of the electrical kitchen appliance (1) via a wired connection between the electrical kitchen appliance (1) and operator control unit (3) in the first operating mode, and the second transmission devices (8, 10) can be used to transfer the control commands for control of the electrical kitchen appliance (1) by radio between the electrical kitchen appliance (1) and operator control unit (3) in the second operating mode.

6. The electrical kitchen appliance according to claim 1, wherein the operator control unit (3) that can be removably attached to the electrical kitchen appliance (1) is the only operator control unit of the electrical kitchen appliance (1).

7. The electrical kitchen appliance according to claim 1, wherein the operator control unit (3) is additionally provided for outputting information data to the user.

8. The electrical kitchen appliance according to claim 1, wherein the operator control unit (3) exhibits a push/rotating button (5) and/or a touch display (4) for entering control commands or outputting information data.

* * * * *